Oct. 10, 1967   C. W. EARP   3,346,860
RADIO NAVIGATION SYSTEM
Filed May 10, 1965   2 Sheets-Sheet 1

Inventor
CHARLES W. EARP
By Percy P. Lantz
Attorney

United States Patent Office 3,346,860
Patented Oct. 10, 1967

3,346,860
RADIO NAVIGATION SYSTEM
Charles William Earp, London, England, assignor to International Standard Electric Corporation, New York, N.Y., a corporation of Delaware
Filed May 10, 1965, Ser. No. 454,315
14 Claims. (Cl. 343—105)

This invention relates to electrical signal transmission systems in which information is communicated in terms of the phase of an electrical wave.

My co-pending United States applications, Ser. Nos. 401,440, filed Oct. 5, 1964, 419,159, filed Dec. 17, 1964, relate to radio navigation systems in which fixed transmitters radiate different pairs of sidebands of the same non-radiated carrier wave and co-operating receivers on mobile craft have means to obtain from the sidebands demodulated signals having respective phases dependent upon the phase shifts between the non-radiated carrier wave and the sidebands. The effective reconstruction of a carrier from upper and lower sidebands cannot be achieved without a two-fold ambiguity of carrier phase, which has the effect of halving the widths of the lanes when the invention is applied to hyperbolic navigation systems.

In the present invention a radio navigation system is provided in which a non-radiated carrier wave from one or more transmitters can be reconstituted in a distant receiver without the above-mentioned two-fold ambiguity of phase.

According to one aspect of the invention there is provided an electrical signal transmission system for communicating information in terms of the phase of an electrical wave, the said electrical wave not being transmitted, wherein two further electrical waves are transmitted, the two further electrical waves being unilaterally displaced in frequency from the said electrical wave by harmonically related difference frequencies and having a mutual phase relationship representative of the phase of the said electrical wave.

According to another aspect of the invention there is provided a radio navigation system including a transmitter to transmit two waves having respective frequencies unilaterally displaced from a third frequency by harmonically related difference frequencies, a receiver to receive the said two transmitted waves and having means to obtain from the two transmitted waves an indication of the phase a wave at the said third frequency would have at the receiver if transmitted from the transmitter.

One embodiment of the invention features the transmission of a third wave from the transmitter which is mixed in the mobile station receiver with one of the two waves to produce a wave which is phase compared with a wave derived in the same way from a third wave transmitted from another transmitter in the system in order to provide lane identification.

In a particular embodiment of the invention the wave to be phase compared for lane identification purposes with the wave derived from the other transmitter is phase corrected by comparison with the reconstituted carrier wave in the receiver.

An embodiment of the invention in a long range V.L.F. hyperbolic radio navigation system will now be described with reference to the drawings accompanying this specification in which.

The receiver is designed to co-operate with three fixed transmitting stations to enable the position of the mobile station in which the receiver is installed to be determined. Each transmitting station transmits three continuous waves having frequencies as follows:

Transmitter No. 1 $nf+f_1$, $nf+2f_1$, $mf+f_1$
Transmitter No. 2 $nf+f_2$, $nf+2f_2$, $mf+f_2$
Transmitter No. 3 $nf+f_3$, $nf+2f_3$, $mf+f_3$ and so on, where $n$ and $m$ are integers.

In this embodiment of the invention $n=10$, $m=12$, $f=1000$ c./s., $f_1=50$ c./s., $f_2=55$ c./s., $f_3=60$ c./s. etc. The waves transmitted by the above mentioned transmitters have therefore frequencies as follows:

Transmitting station No. 1 10,050 c./s., 10,100 c./s. and 12,050 c./s.
Transmitting station No. 2 10,055 c./s., 10,110 c./s. and 12,055 c./s.
Transmitting station No. 3 10,060 c./s., 10,120 c./s. and 12,060 c./s.

The third frequency transmitted from each transmitter is for lane-identification purposes only.

Figure 1:
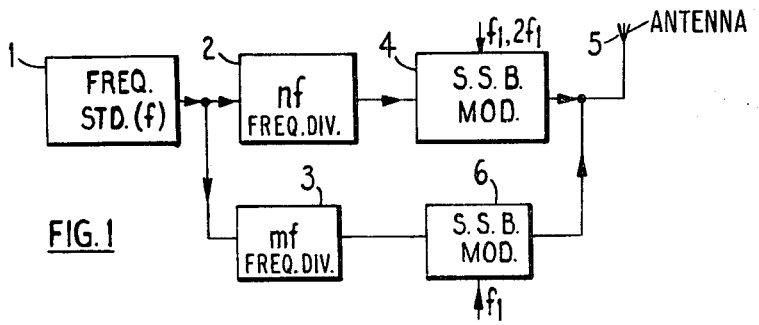
FIG. 1 is a block schematic diagram of equipment at a transmitter.

Referring to FIG. 1, which is a block schematic diagram of transmitter No. 1, there are shown a frequency standard 1 and frequency dividers 2 and 3 which obtain from the output of the frequency standard signals at 10,000 c./s. and 12,000 c./s., respectively. The output of the frequency divider 2 is coupled to the carrier input of a single sideband modulator 4 to the modulating signal input of which modulating signals at 50 c./s. ($f_1$) and 100 c./s. ($2f_1$) are applied. Signals at 10,050 c./s. and 10,100 c./s. are obtained from the output of the modulator 4, the carrier being suppressed, and are fed to a transmitting aerial 5. The output of the frequency divider 3 is coupled to the carrier input of a single sideband modulator 6 to the modulating signal input of which the modulating signal at 50 c./s. is applied. A signal at 12,050 c./s. is obtained from the output of the modulator 6, the carrier being suppressed, and is fed to the transmitting aerial 5.

Similar equipment is installed at the other transmitting stations, the frequencies $nf$ and $mf$ are the same at all the stations. It is pointed out here that the carrier frequencies at each of the transmitting stations must be synchronized with each other for a proper operation of the system herein disclosed. This may be carried out by any well-known technique, such as by transmitting synchronization signals between stations or by using a highly stable frequency source at each station (i.e., an atomic clock). A detailed description of such a synchronization system is not deemed necessary for a proper understanding of this invention and is therefore not included herein. Such synchronization systems are well known and may be designed by one ordinarily skilled in the art within the spirit of this invention. The frequencies of the waves transmitted from the transmitting stations are made different by using modulating signals having different frequencies, $f_1$, $f_2$, $f_3$ etc. to modulate the carrier signals $nf$ and $mf$.

In this embodiment of the invention the transmitted waves are sidebands of carrier waves at $nf$ and $mf$, for the sake of convenience. It would, however, be possible to generate the transmitted waves as independent unmodulated carrier waves.

Figure 2:
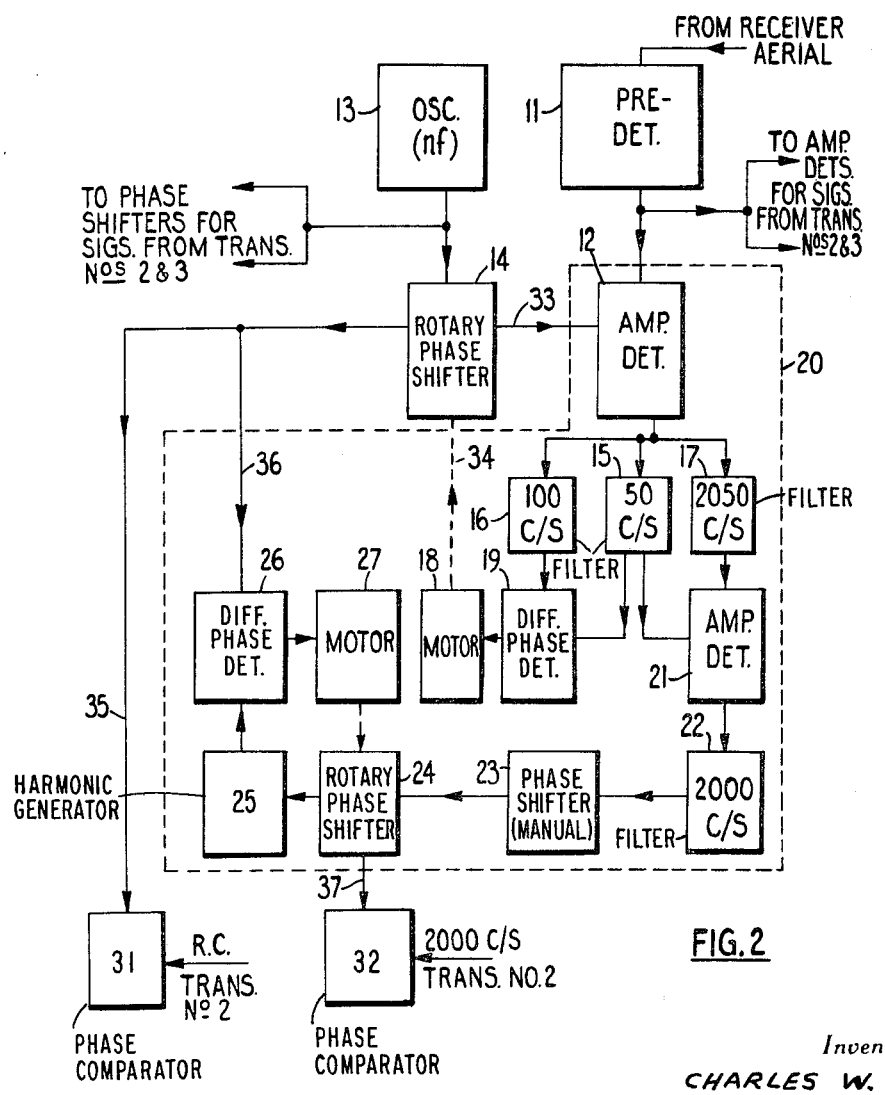
FIG. 2 is a block schematic diagram of equipment at a mobile station receiver.

Referring to FIG. 2 there is shown the predetector stage 11 of the receiver, an amplitude detector 12 coupled to the output of the stage 11, and a high stability oscillator 13, the output of which is coupled to the detector 12 through a rotary phase shifter 14 and a signal path 33.

The output of the amplitude detector 12 is coupled to three filters 15, 16 and 17 which are used to select different beat frequencies from the output of the detector 14. The outputs of filters 15 and 16 are fed to respective inputs of a differential phase detector 19. A motor 18 is coupled to the output of the differential detector 19 and the drive shaft of the motor is coupled to the rotor of the rotary phase shifter 14 via a coupling 34.

The pre-detector stage 11 has a bandwidth sufficiently wide to receive the signals transmitted from transmitting station Nos. 1, 2 and 3 and any other transmitting stations in the system. For the present the description will be concerned only with the signals from the transmitting stations Nos. 1, 2 and 3.

The received waves at 10,050 c./s., 10,100 c./s., and 12,050 c./s. after amplification in stage 11 are beaten in the amplitude detector with the signal from the high stability oscillator 13, which is at 10,000 c./s. i.e. the same frequency as the non-transmitted carrier signal, $nf$, at the transmitting stations. Beat frequencies of 50 c./s. 100 c./s. and 2050 c./s. in the output from the detector 12 are selected by the filters 15, 16 and 17 respectively.

The beat frequency signals at 50 c./s. and 100 c./s. are phase compared in the differential phase detector 19, the output of the phase detector 19 correcting the phase of the 10,000 c./s. oscillator signal fed to the amplitude detector 12 by means of the motor 18 and the rotary phase shifter 14 whenever the phase-relationship between the 50 c./s. and the 100 c./s. signals departs from a predetermined relationship.

The phase of the 10,000 c./s. oscillator signal at the output of the phase shifter 14 represents the reconstituted carrier from transmitting station No. 1, and is the same as the phase that the carrier, $nf$, would have at the mobile station if it were transmitted instead of being suppressed in the single sideband modulator in the transmitter.

It is emphasized that while a frequency stability of at least 1 part in $10^5$ is required for the oscillator 13, it is not actually phase locked to the carrier, $nf$, at the transmitting station.

The phase of the reconstituted carrier is representative of the distance of the mobile station from the transmitting station No. 1. The representation of distance is ambiguous, as in systems where a carrier wave is actually radiated. By comparing the phase of this reconstituted carrier with the phase of a corresponding reconstituted carrier obtained from the waves from either transmitting station No. 3 or No. 2 the system therefore defines a number of hyperbolic lanes spaced by 15 km. (one half-wavelength of the suppressed carrier wave) and, since this embodiment of the invention is in a long range system, lane identification is necessary. This is provided by the transmission of the 12,050 c./s. wave from transmitting station No. 1, and the 12,055 c./s. and 12,060 c./s. waves from transmitting stations Nos. 2 and 3.

By comparing the respective phases of the re-constituted carriers received from all three transmitting stations a fix of the position of the mobile station can be obtained. If it is only required to determine the distance of the mobile station from a fixed transmitting station, then transmitting stations 2 and 3 are not necessary.

Referring again to FIG. 2, an amplitude detector 21 has two inputs coupled to the outputs of the 2050 c./s. and the 50 c./s. filters, 17 and 15, respectively. The output of the detector 21 is coupled to a 2000 c./s. filter 22.

The 2050 c./s. and 50 c./s. beat frequency signals beaten together in the detector 21 and the filter 22 selects the beat frequency signal at 2000 c./s. from the output of the detector. The phase of the 2000 c./s. signal is also representative of the distance of the mobile station from transmitting station No. 1, but owing to the large effective wavelength of the signal (150 km.), the 2000 c./s. signal is used to provide a coarse but unambiguous distance indication and hence identification of the lane in which the mobile station is situated.

Owing to differential transit times for the propagation of the signals at 10,050 c./s. and at 12,050 c./s. inaccuracies can arise in the phase of the 2000 c./s. signal which could result in wrong identification of the lane. A manually operated phase shifter 23 is therefore coupled to the output of the 2000 c./s. filter 22 so that the phase of the 2000 c./s. signal can be manually corrected in accordance with the estimated differential transit time of the two waves.

In cases where the differential transit time is known to better than ±10 microseconds, a final exact correction is achieved by the use of the following additional apparatus:

A rotary phase shifter 24 is coupled between the output of the manually operated phase shifter 23 and the input of a harmonic generator 25. A differential phase detector 26 is coupled between the signal output from the rotary phase shifter 14 and the output of the harmonic generator 25. The signal output from the rotary phase shifter 14 is fed to the input of the phase detector 26 via a signal path 36. The output of the differential phase detector 26 is fed to an electric motor 27, the drive shaft of which is coupled to the rotor of the rotary phase shifter 24.

The output from the manually operated phase shifter 23 after passing through the rotary phase shifter 24 is multiplied in frequency by a factor of 5 in the harmonic generator 25, and the multiplied output at 10,000 c./s. is phase-compared with the reconstituted carrier in the differential detector 26. If the phase relationship between the two signals differs from a predetermined relationship an output is obtained from the differential detector 26 which causes rotation of the drive shaft of the motor 27 and correction of the phase of the 2000 c./s. signal by the rotary phase shifter 24 until the 2000 c./s. signal is corrected.

The phase corrected 2000 c./s. from the output of the rotary phase shifter is now locked in the correct phase relationship with the non-transmitted carrier at 10,000 c./s. and is suitable for phase comparison with a corresponding component at 2000 c./s. from one of the other transmitting stations for lane identification.

The automatic phase correction corrects up to a maximum of ±36 degrees on the 2000 c./s. beat (±180 degrees at the output of the differential detector 26) which represents ±½ lane-width at 10,000 c./s. If the phases of two uncorrected 2000 c./s. components from different beacons were compared, the total error could be up to ± one lane-width at 10,000 c./s. The automatic phase correction is therefore particularly useful when the propagation velocities, and therefore the differential transit time of the 10,050 c./s. and 12,050 c./s. waves, are known to better than ±10 microseconds but are not known with great accuracy.

The signals from the output of the predetector stage 11 are fed to two more amplitude detectors similar to the amplitude detector 12. The amplitude detectors are fed with the 10,000 c./s. signals from the output of the high stability oscillator 13 through separate rotary phase shifters similar to the rotary phase shifter 14.

From the output of each of the two amplitude detectors beat signals having frequencies equal to the frequency difference between the three waves transmitted by a respective one of the transmitting stations Nos. 2 and 3 and the 10,000 c./s. signal from the oscillator 13 are selected by three filters corresponding to the filters 15, 16 and 17. Thus in the case of the signals received from transmitting station No. 2 beat frequencies of 55 c./s., 110 c./s. and 2055 c./s. are selected by the filters. In the case of the signals received from transmitting station No. 3 beat frequencies of 60 c./s., 120 c./s. and 2060 c./s. are selected, and so on.

The beat frequency signals after selection in the respective filters are dealt with in the same way as previously described with reference to the 50 c./s., 100 c./s. and 2050 c./s. signal.

The beat frequency signals at 55 c./s. and 110 c./s. are thus compared in a differential phase detector, corresponding to the detector 19, to produce a signal which controls by means of a rotary phase shifter the phase of the 10,000 c./s. oscillator signal fed to the amplitude detector in which the beat frequency signals are produced. The beat frequency signals at 60 c./s. and 120 c./s. are compared in another differential phase detector to produce a signal which controls by means of another rotary phase shifter the phase of the 10,000 c./s. oscillator signal fed to the amplitude detector in which these beat frequency signals are produced. The 2055 c./s. beat frequency signal is beaten with the 55 c./s. beat frequency signal in an amplitude detector, corresponding to the detector 21, to produce a 2000 c./s. signal, while the 2060 c./s. beat frequency signal is beaten with the 60 c./s. beat frequency signal to produce another 2000 c./s. signal. The two 2000 c./s. signals are manually adjusted in phase to correct for differential transit times and are respectively compared with the reconstituted carriers of transmitting stations Nos. 2 and 3.

The apparatus shown in FIG. 2 with the exception of the pre-detector stages 11 and the oscillator 13, is therefore triplicated at each mobile station.

By comparing the phases of the reconstituted carriers of any two of the transmitting stations an ambiguous indication of the hyperbolic lane in which the mobile station is situated is obtained, and by comparing the phases of the 2000 c./s. signals from the two transmitting stations the hyperbolic lane can be identified. By performing the same process in respect of the signals received from another combination of two transmitting stations a second hyperbolic lane in which the aircraft is situated is identified, and hence a hyperbolic fix is obtained.

Referring again to FIG. 2 the block 31 represents the phase comparator wherein the reconstituted carriers of the transmitting stations Nos. 1 and 2 are compared to provide an accurate but ambiguous hyperbolic lane information. Block 32 represents the phase comparator wherein the 2000 c./s. signals derived from the third frequency waves transmitted from transmitting stations Nos. 1 and 2 are compared to provide lane identification.

Figure 3:
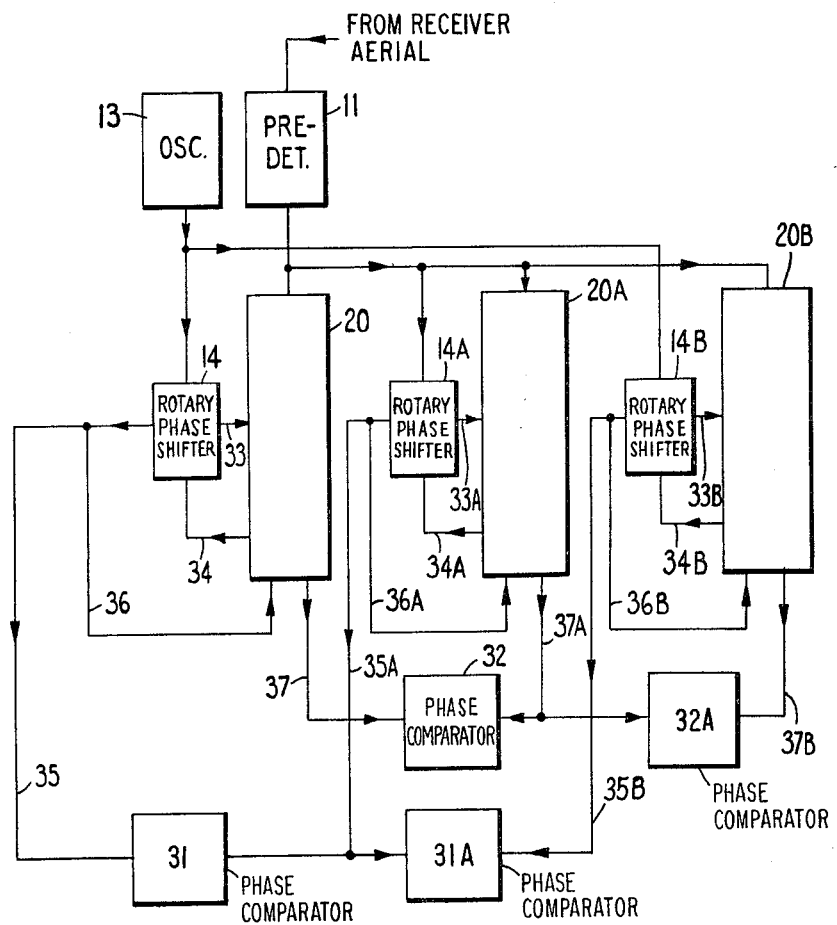
FIG. 3 is a block schematic diagram of further equipment at a mobile station receiver.

Referring to FIG. 3 the block 20 represents the equipment enclosed within the dotted line 20 on FIG. 2. Blocks 20A and 20B represent the corresponding equipment for obtaining the re-constituted carriers from transmitting stations Nos. 2 and 3 respectively. The output from the pre-detector stage 11 is fed to the amplitude detector 12 of each of the stages 20 and to the corresponding detectors in stages 20A and 20B. The output from the 10,000 c./s. oscillator 13 is fed to the amplitude detectors 12 of the stage 20 and to the corresponding detectors in stages 20A and 20B through signal paths 33, 33A and 33B after phase-shifting in rotary phase shifters 14, 14A and 14B respectively. The setting of the phase shifters 14, 14A and 14B is controlled in dependence upon the differential phase detection of the beat frequency signals at $f_1$, $2f_1$, $f_2$, $2f_2$, and $f_3$, $2f_3$ by the couplings 34, 34A and 34B, respectively, in dependence upon the phase difference between the signals at $f_1$ and $2f_1$, $f_2$ and $2f_2$, $f_3$ and $2f_3$, respectively.

The signal paths 36, 36A, and 36B are the paths over which the 10,000 c./s. output signal from the phase shifters 14, 14A and 14B are fed to the respective differential phase detector 26 (FIG. 2) and to the corresponding phase detectors in the stages 20A and 20B, for automatic phase correction.

The output signals of the phase shifters 14 and 14A are fed by signal paths 35 and 35A, respectively, to phase comparator 31. As previously mentioned, this provides a phase comparison of the re-constituted carriers from transmitting stations Nos. 1 and 2. The output signals of the phase shifters 14A and 14B are fed via signal paths 35A and 35B to phase comparator 31B, which provides a phase comparison between the re-constituted carriers from transmitting stations Nos. 2 and 3. These phase comparisons give accurate but ambiguous hyperbolic lane information. Lane identification is given by the phase comparisons provided by phase comparators 32 and 32A. These are connected by signal paths 37 and 37A, 37A and 37B, respectively, between the outputs of the rotary phase shifters 24 of the apparatus represented by blocks 20 and 20A, and 20A and 20B, respectively.

Although in this embodiment of the invention three transmitting stations are used, more than three may be used if a very wide range system is desired, the apparatus apart from the pre-detector stage and the oscillator being duplicated accordingly. If a fix of the position of the mobile station is not required but only its position from a given fixed point a single transmitter could be used, the reconstituted carrier being compared with a highly accurate reference carrier wave in the mobile station.

In some cases the design of a differential detector, such as the detector 19 in FIG. 2, which is required to provide an output when two harmonically related frequencies differ in phase from a predetermined amount may be difficult. The difficulty can be overcome by doubling the frequency of the lower harmonic signal so that two signals of equal frequency are presented to the input of the differential detector.

The maximum power output required from each of the transmitting stations can be reduced by radiating the three waves sequentially in time, phase memory circuits being provided in the receiver in order to maintain control of the rotary phase shifter during "off" periods of the transmitted wave.

The reconstituted carrier could be obtained from the signals from the transmitting stations in different ways from that used in this embodiment of the invention. For example, the carrier could be reconstituted from the signals of transmitting station No. 1 by beating the second harmonic of the 10,100 c./s. signals. The method used in the embodiment is preferred for reasons of signal to noise performance.

Although in the embodiment of the invention described in this specification the transmitting station or stations are fixed while the receiver is at a mobile station, the principles of the invention are also applicable to the case where the receiver is at a fixed location and the transmitting station or stations are mobile.

The principles of the invention can also be applied to other electrical signal transmission systems in which information is transmitter in terms of the phase of an electrical wave and is not limited to the case where the information to be transmitted is navigational information.

It is to be understood that the foregoing description of specific examples of this invention is not to be considered as a limitation of its scope.

What I claim is:

1. A radio navigation system comprising:
    a transmitter including:
        first means for generating a first wave having a first frequency;
        second means for generating only waves unilaterally displaced in the same sense from said first frequency, said unilaterally displaced waves including two waves displaced from said first frequency by harmonically related difference frequencies; and
        means coupled to said generating means to transmit said two waves; and
    a receiver for receiving the said two transmitted waves, said receiver including:
        means to derive from said transmitted waves a signal having a phase proportional to the phase that the wave at the said first frequency would have had at the receiver if transmitted from said transmitter.

2. A radio navigation system according to claim 1 wherein said receiver includes:

third means for generating a wave having a frequency equal to said first frequency;

an amplitude detector coupled to said third generating means and to said receiving means for beating said two waves with the generated wave having said first frequency;

a filter circuit arrangement coupled to said amplitude detector for selecting waves from the output of said amplitude detector, each said selected wave having a frequency equal to a respective one of the difference frequencies between said two transmitted waves and said first frequency wave; and phase measuring means coupled to said filter circuit arrangement for producing an output responsive to the phase difference between said difference frequency waves.

3. A radio navigation system according to claim 2 wherein said phase measuring means includes:
a differential phase detector coupled to said filter circuit responsive to the phase difference between said difference frequency waves;
a motor responsive to the output signal from said differential phase detector; and
a variable phase shifter controlled by said motor and further coupled between the output of said third generating means and said amplitude detector.

4. A radio navigation system according to claim 2 wherein said transmitter includes:
means for transmitting a wave having a fourth frequency displaced from said first frequency by a difference frequency greater than the difference frequency between the said two transmitted waves and said first frequency wave, said fourth frequency wave having a predetermined phase relationship with said two waves; and
wherein said receiver includes:
means for receiving said wave having said fourth frequency;
means coupled to said receiving means for applying said fourth frequency wave to said amplitude detector wherein said fourth frequency wave is beaten with the wave having said first frequency;
a second filter circuit coupled to said amplitude detector for selecting a fifth frequency wave having a frequency equal to the difference frequency between said first and fourth frequency waves; and
means coupled to said second filter circuit for comparing the phase of the fifth frequency wave with the phase of one of said selected waves which has a frequency equal to a respective one of the difference frequencies between the said two transmitted waves and said first frequency.

5. A radio navigation system according to claim 4 wherein said receiver further includes:
a second amplitude detector coupled to said filter circuit;
means coupling said fifth frequency wave to said second amplitude detector wherein it is beaten with one of the two selected waves having frequencies equal to the respective difference frequencies between said two transmitted waves and said first frequency waves;
a third filter circuit coupled to said second amplitude detector for selecting a sixth frequency wave having a frequency equal to the difference frequency between said fifth frequency wave and the said one of said two selected waves; and
means coupled to said third filter circuit for measuring the phase of said sixth frequency wave.

6. A radio navigation system according to claim 5 further comprising an adjustable phase shifted coupled to said third filter circuit for adjusting the phase of said sixth frequency wave in accordance with the differential transit time between the respective one of said two transmitted waves and said fourth frequency wave.

7. A radio navigation system according to claim 6 wherein said sixth frequency wave has a frequency which is an integral subharmonic of the frequency of said first frequency wave and wherein said adjustable phase shifter provides coarse phase adjustment, further comprising:
means for automatically correcting the phase of the sixth frequency wave after coarse correction in said adjustable phase shifter, said automatic correcting means including:
a second phase shift arrangement coupled to said third filter circuit for phase shifting said sixth frequency;
means for comparing a harmonic of the wave from the output of said second phase shift arrangement with the first frequency signal; and
means coupled to said comparing means and to said second phase shift arrangement for varying the phase shift of said second phase shift arrangement in reponse to the said phase comparison between said sixth frequency wave and said harmonic.

8. A radio navigation system according to claim 4 wherein said receiver further includes a predetector stage having a bandwidth sufficiently wide to receive said two transmitted waves and said fourth frequency wave.

9. A radio navigation system according to claim 2 including:
at least one further transmitter distinct from said first transmitter, said further transmitter having means for generating two waves having respective frequencies unilaterally displaced from the first frequency of said first transmitter by harmonically related difference frequencies and having different frequencies from said two waves transmitted from said first transmitter; and
wherein said receiver includes:
means for receiving the respective two waves transmitted from both said transmitters;
a further amplitude detector coupled to said receiving means for beating the two waves from said further transmitter with the wave having the first frequency;
a further filter circuit coupled to said further amplitude detector for selecting further difference frequency waves, each said selected wave having a frequency equal to a respective one of the difference frequencies between the said two waves transmitted from said further transmitter and the first wave; and
a further phase measuring arrangement coupled to said further filter circuit responsive to the phase difference between said further difference frequency waves.

10. The radio navigation system according to claim 9 wherein said further phase measuring arrangement includes:
a differential phase detector coupled to said further filter circuit and responsive to the difference between said further difference frequency waves;
a motor responsive to the output from said further differential phase detector; and
a variable phase shifter controlled by said further motor and further coupled between the output of said third generating means and said amplitude detector.

11. A radio navigation system according to claim 10 further including means for phase comparing the wave at said first frequency appearing at the output of said variable phase shifter with the wave at said first frequency appearing at the output of said further vairable phase shifter.

12. A radio navigation system according to claim 1 wherein said receiver includes:
 a pre-detector stage having a bandwidth sufficiently wide to receive said two transmitted waves;
 a generator to generate a wave having a frequency equal to said first frequency;
 an amplitude detector coupled to said pre-detector stage and to said generator for beating said two waves with said first frequency wave;
 a filter circuit arrangement coupled to said amplitude detector for selecting waves from the output of said amplitude detector, each said selected wave having a frequency equal to a respective one of the difference frequencies between said two transmitted waves and said first frequency wave; and
 a phase measuring arrangement coupled to said filter circuit responsive to the phase difference between the said selected difference frequency waves.

13. A radio navigation system according to claim 12 wherein said phase measuring means includes:
 a differential phase detector coupled to said filter circuit responsive to the phase difference between said selected difference frequency waves;
 a motor responsive to the output signal from said differential phase detector; and
 a variable phase shifter controlled by said motor and further coupled between the output of the generator of the wave having said first frequency and said amplitude detector.

14. A radio navigation system according to claim 1 wherein the means for generating the two transmitted waves at said transmitter includes:
 means for generating a first low frequency modulating signal;
 means for generating a further low frequency modulating signal having a frequency equal to an integral harmonic of said first low frequency modulating signal; and
 means for modulating said first frequency wave with said first low frequency signal and with said further low frequency signal and for suppressing said first frequency wave.

References Cited
UNITED STATES PATENTS

| | | | |
|---|---|---|---|
| 2,530,614 | 11/1950 | Hugenholtz | 325—329 |
| 2,924,706 | 2/1960 | Sassler | 325—329 |
| 2,938,114 | 5/1960 | Krause | 325—329 |
| 3,150,372 | 9/1964 | Groth | 343—105 X |

FOREIGN PATENTS 683,689  12/1952  Great Britain.

RODNEY D. BENNETT, *Primary Examiner.*

CHESTER L. JUSTUS, *Examiner.*

H. C. WAMSLEY, *Assistant Examiner.*